US011645682B2

(12) United States Patent
Casalino et al.

(10) Patent No.: US 11,645,682 B2
(45) Date of Patent: May 9, 2023

(54) REVIEW RESPONSE GENERATION AND REVIEW SENTIMENT ANALYSIS

(71) Applicant: Yext, Inc., New York, NY (US)

(72) Inventors: Calvin Casalino, New York, NY (US); Victoria Beall, Brooklyn, NY (US); Jonathan Kennell, New York, NY (US); Benjamin Berry, New York, NY (US)

(73) Assignee: Yext, Inc., New York, NY (US)

( * ) Notice: Subject to any disclaimer, the term of this patent is extended or adjusted under 35 U.S.C. 154(b) by 356 days.

(21) Appl. No.: 16/676,020

(22) Filed: Nov. 6, 2019

(65) Prior Publication Data

US 2020/0151777 A1 May 14, 2020

Related U.S. Application Data

(60) Provisional application No. 62/757,544, filed on Nov. 8, 2018.

(51) Int. Cl.
*G06Q 30/02* (2012.01)
*G06F 40/30* (2020.01)
*G06Q 30/0282* (2023.01)

(52) U.S. Cl.
CPC ......... *G06Q 30/0282* (2013.01); *G06F 40/30* (2020.01)

(58) Field of Classification Search
CPC ............... G06Q 30/0282; G06Q 50/01; G06Q 30/0201; G06Q 30/01; G06Q 30/0281
See application file for complete search history.

(56) References Cited

U.S. PATENT DOCUMENTS 9,384,501 B2 7/2016 Capuozzo et al.
10,909,585 B2 * 2/2021 L'Huillier ......... G06F 16/24578
(Continued)

FOREIGN PATENT DOCUMENTS

CN 105378707 A 3/2016
EP 2801091 B1 9/2017

OTHER PUBLICATIONS

Savarimuthu, Bastin Tony Roy, et al. "Developers' Responses to App Review Feedback—A Study of Communication Norms in App Development." Coordination, Organizations, Institutions, Norms, and Ethics for Governance of Multi-Agent Systems XIII. Springer, Cham, 2017. 57-75 (Year: 2017).*

(Continued)

*Primary Examiner* — Gabrielle A McCormick
*Assistant Examiner* — Maame Ofori-Awuah
(74) *Attorney, Agent, or Firm* — Lowenstein Sandler LLP

(57) ABSTRACT

A system and method to generate substantive and quality responses to end user reviews for publication via an online review platform. A review associated with a merchant system is identified, the review including multiple review elements. Extracting a set of key review elements from the multiple review elements. A sentiment score associated with a first key review element of the set of key review elements is determined. A review response is generated to include a set of values corresponding to a set of response components, wherein a first value of the set of values comprises the first key review element. The review response including the sentiment score associated with the first key review element is displayed.

15 Claims, 29 Drawing Sheets

(56) References Cited

U.S. PATENT DOCUMENTS

| | | | |
|---|---|---|---|
| 2011/0153414 A1* | 6/2011 | Elvekrog | H04L 67/306 |
| | | | 709/204 |
| 2011/0264598 A1 | 10/2011 | Fuxman et al. | |
| 2013/0085804 A1* | 4/2013 | Leff | G06Q 30/0219 |
| | | | 705/7.29 |
| 2013/0317808 A1 | 11/2013 | Kruel et al. | |
| 2016/0300135 A1 | 10/2016 | Moudy et al. | |
| 2018/0174203 A1 | 6/2018 | LHuillier et al. | |
| 2019/0066136 A1* | 2/2019 | Kopikare | H04L 51/02 |

OTHER PUBLICATIONS

Greenheld, Georgia et al. "Automating Developers' Responses to App Reviews." 2018 25th Australasian Software Engineering Conference (ASWEC) (2018): 66-70. (Year: 2018).*

Natural Language "Derive Insights From Unstructured Text Using Google Machine Learning", Cloud Natural Language, API, accessed Nov. 6, 2019, 16 pages.

International Search Report and Written Opinion for PCT Patent Application No. PCT/US2019/060095 dated Feb. 3, 2020, 6 pages.

European Office Action for EP Application No. EP19883239.6 dated Jul. 8, 2022, 4 pages.

* cited by examiner

FIG. 1B

| REVIEW ELEMENT (Keyword) | REVIEW ELEMENT (Modifier) | SENTIMENT VALUE |
|---|---|---|
| barber | nice | +10 |
| haircut | great | +90 |
| floor | dirty | -90 |
| Bart | best | +95 |

FIG. 1C

| RESPONSE COMPONENT | EXAMPLE |
|---|---|
| Greeting | Hi, [Reviewer Name] |
| Value Statement | We always want to serve you as efficiently as possible and provide you only the highest quality products. |
| Sentiment Keywords | I apologize for the dirty floor at our location. |
| Closing | We'd love a chance to make the situation right. |

REVIEW TITLE

REVIEWER NAME  Time/Date

★
★
★
☆

+ Add Label  190C  190A  190B

HONEYDUKES IS THE BEST SHOP IN HOGSMEADE! Plenty of pumpkin pasties, chocolate frogs, and of course my personal favorite, Bertie Bott's Every Flavor Beans. There is always such great service and the proprietor is just the best person to talk to about all things candy! They always seem to have the right selection for the season, too.

190D  190E  190F  190G  190H

GREETING
[Select Greeting ∨]  191A

VALUE STATEMENT
[Select Statement ∨]  191B

SENTIMENT KEYWORDS
[Select Keywords ∨]  191C

CLOSING
[Select Closing ∨]  191D

Write a Comment

[Cancel]  [Respond]

Location Address

FIG. 1E

REVIEW TITLE — 115

REVIEWER NAME   Time/Date                                        X Live   __ Flag ★ ☆
★                    SENTIMENT   MODIFIER   KEYWORD
★
★                         +60         BEST      PERSON         — 135
+ Add Label HONEYDUKES IS THE BEST SHOP IN HOGSMEADE! Plenty of pumpkin pasties, chocolate frogs, and of course my personal favorite, Bertie Bott's Every Flavor Beans. There is always such great service and the proprietor is just the [best person] to talk to about all things candy! They always seem to have the right selection for the season, too.

Use these suggestions to help generate your response:

| Best Shop | Great Service | Best Person | Right Selection |

Write a Comment

Cancel    Respond

Identify a review associated with a merchant system, where the review includes multiple review elements
210

↓

Extract a set of key review elements from the multiple review elements
220

↓

Determine a sentiment score associated with a first key review element of the set of key review elements
230

↓

Generate a review response including a set of values corresponding to a set of response components, where a first value of the set of values comprises the first key review element
240

↓

Cause a display of the review response and the review comprising the sentiment score associated with the first key review element
250

↓

Distribute the review response to a review platform
260

FIG. 2B

Knowledge Management System    Listings    Pages    Reviews    Analytics    Application
Account Settings
Custom Responses    Template Responses

Custom Review Responses
Configure which options your users will have in each of the four sections available when they build responses to reviews.

---

1. GREETING                                                          [ ADD OPTION ]

INTRODUCTORY STATEMENT TO ADDRESS THE REVIEWER TO START THE RESPONSE

NO GREETING OPTIONS
ADD A NEW GREETING OPTION

---

2. VALUE STATEMENT                                                   [ ADD OPTION ]

A STATEMENT OF WHAT MATTERS TO YOUR COMPANY WITH RESPECT TO THE CUSTOMER EXPERIENCE

NO VALUE STATEMENT OPTIONS
ADD A NEW GREETING OPTION

---

3. SENTIMENT KEYWORDS                                                [ ADD OPTION ]

PHRASES BUILT AROUND POSITIVE OR NEGATIVE SENTIMENT KEYWORDS AND/OR MODIFIERS IDENTIFIED IN THE REVIEW ITSELF

NO SENTIMENT KEYWORD OPTIONS
ADD A NEW GREETING OPTION

---

4. CLOSING                                                           [ ADD OPTION ]

FINAL REMARKS TO THE REVIEWER

NO CLOSING OPTIONS
ADD A NEW GREETING OPTION

FIG. 2C

Knowledge Management System    Listings    Pages    Reviews    Analytics    Application Account Settings

Custom Responses      Template Responses

Custom Review Responses

Configure which options your users will have in each of the four sections available when they build responses to reviews.

1. GREETING
Introductory statement to address the reviewer to start the response

| OPTION NAME | OPTION TEXT | |
|---|---|---|
| GREETING 1 | HELLO, [NAME] | EDIT |
| GREETING 2 | HI, [NAME] | EDIT |
| GREETING 3 | THANK YOU FOR YOUR HONEST FEEDBACK, [NAME] | EDIT |
| GREETING 4 | WE APPRECIATE YOUR FEEDBACK, [NAME] | EDIT |
| GREETING 5 | HEY THERE, [NAME] | EDIT |

2. VALUE STATEMENT
A statement of what maters to your company with respect to the customer experience

| OPTION NAME | OPTION TEXT | |
|---|---|---|
| VALUE STATEMENT 1 | It is important to us that you enjoy your visit each time you are at our store. | EDIT |
| VALUE STATEMENT 2 | Providing high quality and fresh candy is an important part of what we do. | EDIT |
| VALUE STATEMENT 3 | We take pride in our customer service. | EDIT |
| VALUE STATEMENT 4 | Here at Honeydukes, it is important to us that you look forward to every visit. | EDIT |
| VALUE STATEMENT 5 | Our top priority is making sure that your store experience is the best it can be every single time you visit our shop. | EDIT |

3. SENTIMENT KEYWORDS
Phrases built around positive or negative sentiment keywords and/or modifiers identified in the review itself

| OPTION NAME | OPTION TEXT | SENTIMENT TYPE | |
|---|---|---|---|
| SENTIMENT 1 | We are sorry to hear that you were disappointed with the [MODIFIER] + [KEYWORDS] | Negative | EDIT |
| SENTIMENT 2 | We are happy to hear that you enjoyed your visit to the [MODIFIER] + [KEYWORDS] so much. | Positive | EDIT |
| SENTIMENT 3 | Honeydukes apologies for the [MODIFIER] + [KEYWORDS] | Negative | EDIT |
| SENTIMENT 4 | We are sorry that the [MODIFIER] + [KEYWORDS] was not up to our usual standards. | Negative | EDIT |
| SENTIMENT 5 | We are glad that you enjoyed the [MODIFIER] + [KEYWORDS] during your visit! | Positive | EDIT |

4. CLOSING
Final remarks to the reviewer

| OPTION NAME | OPTION TEXT | |
|---|---|---|
| CLOSING 1 | Thank you for your feedback, and we hope to see you again soon! | EDIT |
| CLOSING 2 | We will take your feedback into consideration and make improvements to avoid these concerns and improve your experience in the future. | EDIT |
| CLOSING 3 | We appreciate your honest comments and are sorry that you did not get to see our service at its best. | EDIT |
| CLOSING 4 | We are always happy to hear when our customers are happy. | EDIT |
| CLOSING 5 | Thank you for making us aware of these problems, and we hope to make it up to you next time you visit! | EDIT |

FIG. 2D

ADD GREETING OPTIONS
Customize the options that your users can select when they are building a response to a customer review.

1. Name This Option

2. Write Option

Cancel   Add Option

FIG. 2E
ADD SENTIMENT KEYWORD OPTION
Customize the options that your users can select when they are building a response to a customer review.
1. Name This Option
2. Choose Sentiment Type
 POSITIVE    NEGATIVE
3. Write Option
[MODIFIERS] + [KEYWORDS]
4. Sentiment Value
+/- 0 to 100
Cancel   Add Option

FIGURE 3A

REVIEW TITLE

USER NAME   Time/Date

★
★
★  ☆

+ Add Label

Location Address

HONEYDUKES IS THE BEST SHOP IN HOGSMEADE! Plenty of pumpkin pasties, chocolate frogs, and of course my personal favorite, Bertie Bott's Every Flavor Beans. There is always such great service and the proprietor is just the best person to talk to about all things candy! They always seem to have the right selection for the season, too.

GREETING
[Select Greeting ˅]
  Hi, [Reviewer name]
  Greetings, [Reviewer name]
  Hey there, [Reviewer name]
  Thank you, [Reviewer name]

VALUE STATEMENT
[Select Statement ˅]

SENTIMENT KEYWORDS
[Select Keywords ˅]

CLOSING
[Select Closing ˅]

[Cancel]   [Respond]

FIGURE 3B

REVIEW TITLE

REVIEWER NAME   Time/Date

Location Address

+ Add Label

HONEYDUKES IS THE BEST SHOP IN HOGSMEADE! Plenty of pumpkin pasties, chocolate frogs, and of course my personal favorite, Bertie Bott's Every Flavor Beans. There is always such great service and the proprietor is just the best person to talk to about all things candy! They always seem to have the right selection for the season, too.

VALUE STATEMENT
[Select Statement ▾]

SENTIMENT KEYWORDS
[Select Keywords ▾]

CLOSING
[Select Closing ▾]

GREETING
[Hi, [Reviewer name]]

Hi, [Reviewer name]

[Cancel]   [Respond]

REVIEW TITLE

REVIEWER NAME   Time/Date

★ ★ ★ ★ ☆

+ Add Label

X Live   ___ Flag

HONEYDUKES IS THE BEST SHOP IN HOGSMEADE! Plenty of pumpkin pasties, chocolate frogs, and of course my personal favorite, Bertie Bott's Every Flavor Beans. There is always such great service and the proprietor is just the best person to talk to about all things candy! They always seem to have the right selection for the season, too.

HONEYDUKES  Time/Date
Reviewer Name

*Thank you! We hope you visit us again soon!*

[ Edit ]   [ Delete ]

FIG. 8

| Entities | | Sentiment | Mentions |
|---|---|---|---|
| topgolf | | 90 | 1 |
| Service | great | 90 | 1 |
| | | 90 | 1 |
| food | terrible | -90 | 1 |
| | | -90 | 1 |

FIGURE 12

Create Collection

Creating a collection of multiple keywords will give you a rolled-up view of statistics.

Collection Name
Food

Select Keywords
Of the 400 Keywords we've identified in your reviews

Food
Breakfast
Pancakes
Coffee

+ Add Keyword

Edit Collection

Collection Name
Food

Select Keywords
Of the 400 Keywords we've identified in your reviews

Food
Breakfast
Pancakes
Coffee

+ Add Keyword

REVIEW RESPONSE GENERATION AND REVIEW SENTIMENT ANALYSIS

CROSS REFERENCE TO RELATED APPLICATION

This application claims the benefit of U.S. Provisional Application No. 62/757,544, filed Nov. 8, 2018, titled "Review Response Generation and Review Sentiment Analysis", the entire disclosure of which is incorporated herein by this reference.

TECHNICAL FIELD

The disclosure relates generally to a platform for managing reviews, and more particularly to a platform to generate responses to reviews in view of a determined sentiment associated with the review.

BACKGROUND

Increasingly, customers (e.g., end users) are utilizing online platforms to provide reviews and feedback regarding goods and services. Conventionally, the customer sets forth his or her opinion regarding an experience, and the review is published to the public for consumption. These online platforms have become a primary source for prospective customers who are researching a merchant. In this regard, both positive and negative reviews (individually and in the aggregate) have a significant impact on a merchant's reputation. However, the increasing number of platforms where a customer can express his or her opinion in a public manner has created a significant challenge to merchant to manage the impact on their online branding.

BRIEF DESCRIPTION OF THE FIGURES

The present disclosure will be understood more fully from the detailed description given below and from the accompanying drawings of various implementations of the disclosure.

FIG. 1B illustrates an example data structure including a sentiment score value associated with example keyword and modifier pairs, according to embodiments of the present disclosure.

FIG. 1C illustrates example response components generated by a review management system, according to embodiments of the present disclosure.

FIGS. 1D and 1E illustrate example interfaces generated by a review management system including response components and selectable options relating to generation of a review response, according to embodiments of the present disclosure.

FIG. 2A is a diagram illustrating an example generation of a review response by a review management system, according to embodiments of the present disclosure.

FIGS. 2B-2E illustrate example interfaces generated by a review management system, according to embodiments of the present disclosure.

FIGS. 3A-3G illustrate example interfaces generated by a review management system, according to embodiments of the present disclosure.

FIGS. 5A-5B illustrate example interfaces generated by a review management system, according to embodiments of the present disclosure.

FIG. 8 illustrates an example data structure including example entities, sentiment scores, and mentions count values generated by a review management system, according to embodiments of the present disclosure.

FIGS. 10-13 illustrate example interfaces including sentiment information relating to keywords and collections, according to embodiments of the present disclosure.

DETAILED DESCRIPTION

Consumers of goods and services (also referred to as "end users" or "customers") provide feedback regarding the purchasing and consumption experience by way of online reviews. Using an electronic platform (e.g., a goods or services provider website or a third-party website), an end user may submit a review that may include natural language input (e.g., one or more words describing the end user's sentiment regarding the goods/services), a rating (e.g., a numerical rating, a star rating, etc.), or other form of feedback. It is particularly important for a provider (also referred to as a "merchant" or "business") to consider end user reviews and provide a quality response.

According to embodiments of the present disclosure, described herein are systems and methods (also referred to as a "review management system") for generating substantive and quality responses to end user reviews for publication via an online review platform (e.g., a review website or application, a social media platform, a website associated with a merchant, etc.). In an embodiment, the system and method perform an analysis of a sentiment associated with one or more words, phrases, icons, symbols, etc. of a review submitted to an online review platform or other electronic communication by an end user. As used herein, the term "review" refers to the one or more characters, symbols, icons, images, etc. submitted via a review platform (e.g., a first party website or third party service) relating to merchant or business.

In some embodiments, the review management system is communicatively coupled to multiple online review platforms (e.g., Yelp™, TripAdvisor™, etc.) to identify reviews submitted by one or more end user systems. In another embodiment, the access may be through one or more API integrations with the third-party review sites. In other embodiments it also may be through scraping, JavaScript or any other method of pulling data from such sites. For example, an apparatus (e.g., a web crawler) may be used to crawl through third-party review sites on the Internet and pull such review information into the review management system. In other embodiments, the reviews may exist on a first-party site (e.g., a merchant system), which may be communicatively coupled with the review management system, or may be directly hosted and generated on the review management system. A merchant system may use the review management system to request reviews from its customers. Such reviews may be captured on the third-party platforms or websites, a website or application associated with the merchant system, or the review management system, as described in detail below.

Figure 1A:
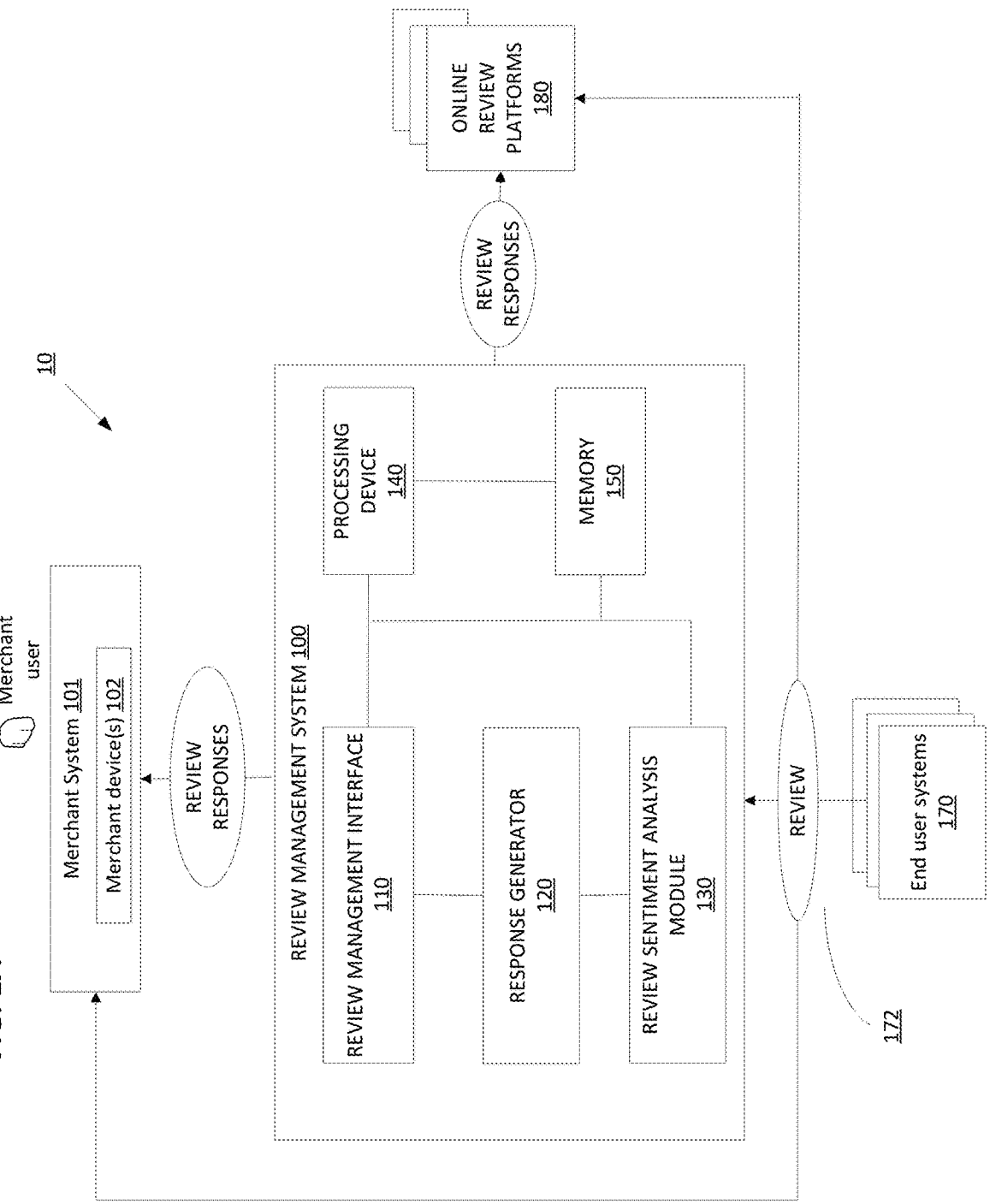
FIG. 1A illustrates an example environment including a review management system, according to embodiments of the present disclosure.

FIG. 1A illustrates an example environment 10 including a review management system 100 operatively coupled to one or more merchant systems 101. In one embodiment, the review management system 100 enables a user (herein referred to as a "merchant user") operating a communicatively connected merchant device 102 on behalf of the merchant system 101 manage the generation and distribution of responses to end user reviews, in accordance with one or more aspects of the disclosure. As shown, the review management system 100 is operatively coupled to one or more online review platforms 180. The online review platforms 180 can include a third-party website or application configured to receive and publish reviews 172 relating to one or more merchants. In an embodiment, the online review platforms 180 can receive the reviews directly from one or more end user systems 170 or via the review management system 100 (e.g., wherein the review management system 100 is integrated into the merchant system 101 and/or the online review platform 180).

According to embodiments, the review management system 100 includes one or more modules configured to perform various functionality, operations, actions, and activities, as described in detail herein. In an embodiment, the review management system 100 includes a review management interface 110, a response generator 120, and a review sentiment analysis module 130 operatively coupled to one or more processing devices 140 and a memory 150. In an embodiment, the memory can include one or more databases configured to store data (e.g., reviews, responses, instructions, programs, communication histories, etc.) relating to the review management system 100. In one embodiment, the software modules may be executed on one or more computer platforms of the knowledge search system that are interconnected by one or more networks, which may include the Internet. The software modules may be, for example, a hardware component, circuitry, dedicated logic, programmable logic, microcode, etc., that may be implemented by a processing device 140 executing instructions stored by the memory 150 of the review management system 100.

In an embodiment, the review management system 100 is operatively coupled to the one or more merchant systems 101, the one or more end user systems 170, and the one or more online review platforms 180 via a suitable network (not shown), including, for example, the Internet, intranets, extranets, wide area networks (WANs), local area networks (LANs), wired networks, wireless networks, or other suitable networks, etc., or any combination of two or more such networks. In one embodiment, the review management system 100 includes a processing device 140 and a memory 150 configured to execute and store instructions associated with the functionality of the various components, services, and modules of the review management system 100, as described in greater detail below in connection with FIGS. 1-15.

In one embodiment, the merchant system 101 and/or the online review platforms 180 may include one or more components of the review management system 100. In this embodiment, the merchant system 101 and the review management system 100 (and/or one or more of the online review platforms 180 and the review management system 100) may be integrated such that the merchant system 101 employs the review management system 100 and its related functionality to receive a review 172, analyze the review 172, and generate a review response 175 to the review 172 respond to one or more search queries 172 received from a communicatively connected end user system 170. According to embodiments of the present disclosure, as shown in FIG. 1, the end user system 170 may submit a review 172 to the merchant system 101 (wherein the merchant system 120 is integrated with the knowledge search system 100), submit a review 172 associated with the merchant system 101 to the review management system 100, and/or submit a review 172 associated with the merchant system 101 to one or more online review platforms 180.

According to embodiments, the review management system is configured to interface with one or more users (e.g., merchant users) operating one or more merchant devices 102 to process and manage reviews and review responses associated with a merchant. According to embodiments, the present disclosure describes various methods, processes, and operations that may be performed by processing logic that may include hardware (e.g., circuitry, dedicated logic, programmable logic, microcode, etc.), software (e.g., instructions executed by a processing device), firmware or a combination thereof, of the review management system 100.

In some examples, an end user system 170 (e.g., a reviewer) may submit a review 172 which contains multiple different review elements (e.g., words, characters, numbers symbols, images, etc.). According to embodiments, the review sentiment analysis module 130 is configured to receive the review, identify the one or more review elements, and extract or parse out or identify a set of key review elements to be used in the generation of a review response. In an embodiment, the review sentiment analysis module 130 can maintain a library of review elements that are defined as "key" or "important" review elements that are to be identified for the purposes of determining sentiment and generating a review response. In an embodiment, the key review elements can be an element extracted or parsed from an end user review that expresses or is associated with a sentiment, feeling, judgment, opinion, characterization, rating, evaluation, etc. of an aspect of a good or service associated with a merchant.

According to embodiments, the review sentiment analysis module 130 is configured to execute sentiment analysis of the review and generate one or more review responses to enable a merchant system to identify items to address in the review response. In an embodiment, the review sentiment analysis module 130 determines a sentiment score associated with each of the identified set of review elements. In an embodiment, the review elements can be categorized as a keyword type or a modifier type.

In an embodiment, the review sentiment analysis module 130 maintains a mapping or association between multiple different review elements (e.g., keywords, phrases, characters, symbols, etc.) and a corresponding sentiment score. In an embodiment, a review element can be designated as having a negative sentiment and assigned a negative sentiment score (e.g., −100 to −1). In an embodiment, a review element can be designated as having a positive sentiment and assigned a positive sentiment score (e.g., +1 to +100). In an embodiment, a review element that is deemed neutral or not indicative of a sentiment can be assigned a sentiment score of 0. For example, a word such as "great" can be assigned a sentiment score of +80 (e.g., on a scale of −100 to +100). In another example, a "thumbs down" symbol can be assigned a sentiment score of −85. In an embodiment, the merchant system can provide input that is used to assign the respective sentiment scores to the multiple different review elements tracked by the sentiment analysis module 130.

In an example, the review management system 100 may identify the following review 172 from an end user system 172 relating to a first location of a merchant: "The barber gave me a great haircut and was very nice. The floor was dirty, and I waited for a long time. Giving 4 stars because Bart is the best." In this example, the review sentiment analysis module 130 can extract from the review a set of review elements including the following elements: "barber", "haircut", "floor", "Bart" "nice", "great", "dirty", and "best", as shown in FIG. 1B. In an embodiment, multiple review elements can be grouped or paired to establish a relationship between the review elements. For example as shown in the table of FIG. 1B, the "barber" review element is associated with the "nice" review element, the "haircut" review element is associated with the "great" review element, the "floor" review element is associated with the "dirty" review element" and the "Bart" review element is associated with the "best" review element. In some embodiments, the sentiment analysis module 130 parses out the following adjective-keyword pairs. In an embodiment, the parsed review may be displayed or presented to a merchant system as shown in the example in FIG. 1D, wherein one or more review elements are presented via an interface with highlights (e.g., bold text).

FIG. 1B further illustrates an example mapping or association of extracted review elements and a corresponding sentiment value or score. As shown in FIG. 1B, the "nice" review element is assigned a sentiment value of +10, the "great" review element is assigned a sentiment value of +90, the "dirty" review element is assigned a sentiment value of −90, and the "best" review element is assigned a sentiment value of +95.

In an embodiment, the response generator 120 is configured to generate one or more components of the review response. In an embodiment, multiple different groups or types of components can be generated by the response generator 120. Example component groups can include a greeting, a value statement, sentiment keywords, and a closing. It is noted that the response generator 120 is configurable (e.g., by a merchant system) to generate a review response using alternative or additional response components. In an embodiment, the response generator 120 can generate a component value for each of the response components, where the component value includes characters, sentences, words, phrases, images, etc. to be included in the generated review response. The response generator 120 can generate an entire review response or at least a portion of the review response to be augmented or added to by a merchant system 101.

FIG. 1C shows a table including example response components and corresponding component values. In an example, as shown in FIG. 1C, a review response may include multiple components. The response components (e.g., the greeting, value statement, sentiment keywords, and closing) may be editable templates the merchant system 101 manages and/or customizes. In an embodiment, the sentiment keywords component dynamically populates data (e.g., review elements) identified by the review sentiment analysis module 130 (e.g., one or more review elements from the table shown in FIG. 1B).

In an embodiment, the merchant system 101 can add one or more response component types or sections (e.g., greeting, value statement, sentiment keywords, closing) to their response input box or "re-roll" the review response entirely. Using suggested items accelerates the response process and ensures the merchant system is responding to the proper actionable items found in their reviews.

In an embodiment, the review management interface 110 of the review management system 100 can provide access to an operatively coupled merchant system 101 to manage review and response associated with the merchant system 101. FIGS. 1D and 1E illustrate example interfaces 115 generated by the review management interface 110. In an embodiment, a merchant user may employ a merchant device 102 of a merchant system 101 to communicatively couple to the review management interface 110 of the review management system 100. In one embodiment, the merchant user logs into the review management system 10 (e.g., using credentials such as a username and password) to access the merchant user's account and one or more end user reviews that may be responded to by the merchant user. In an embodiment, the review merchant system 100 generates an interface 115 accessible by the merchant user to display the one or more reviews (e.g., example reviews shown in FIGS. 1D and 1E). As shown, in FIG. 1D, the review presented by the interface 115 can include information identifying the review (e.g., a review title, a reviewer name (e.g., end user name), a rating (e.g., 4 out of 5 stars), a time and date of the review, a location of the merchant that the review relates to, and the substance of the review). As shown in FIG. 1D, one or more review elements identified by the review management system as key elements 190A-190H, presented by the interface 115 in highlighted or bolded text. The interface includes multiple response components 191A-191D (e.g., greeting, value statement, sentiment keywords, and closing) for which component values can be selected or inputted by the merchant system 101 to generate a review response.

FIG. 1E illustrates an example interface 115 including a portion having sentiment value information 135 associated with a first key review elements (e.g., "best person"). As shown in the example, the sentiment analysis module 130 identifies a sentiment score of +60 relating to the modifier "best" and the keyword "person". In an embodiment, the interface 115 can display sentiment value information 135 corresponding to each of the key review elements, either automatically or in response to a user action (e.g., hovering with a pointer over a key review element, clicking on key review element, etc.).

FIG. 2A illustrates a flow diagram of a method 200 to manage a review associated with a merchant and generate a review response, according to embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the review response system 100 of FIG. 1A. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

According to embodiments, in operation 210, the processing logic identifies a review associated with a merchant system, where the review includes multiple review elements. In an embodiment, the review is identified by executing a crawling operation to scan multiple third party websites and applications (e.g., online review platforms). In an embodiment, the review is identified in response to receiving the review from an end user system, the merchant system, or an online review platform. In an embodiment, the review elements can include any symbol, word, phrase, image, punctuation, character, etc. that make up the body or substance of a review submitted by an end user system. In an embodiment, the review elements can be submitted by an end user system via a free form or natural language text submission interface of the merchant system, an online review platform, or the review management system. In an embodiment, the identified review can be retrieved from a data store (e.g., a library) configured to store reviews associated with the merchant system. In some embodiments, the data store stores multiple reviews associated with the merchant system that are received or collected from any of a number of different sources (e.g., a first party website of the merchant user, a third-party website such as Google™, Yelp™, etc., or other source of reviews).

In operation 220, the processing logic extracts a set of key review elements from the multiple review elements. In an embodiment, the processing logic can maintain a data store including predefined key review elements (e.g., characters, words, phrases, symbols, etc. that are identified as representative or indicative of a sentiment, person, good, service, keyword, modifier, etc). In an embodiment, the merchant system can configure or predefine one or more key review elements to be tracked and extracted by the review management system. The key review elements can be displayed to the merchant system as "suggestions" to assist the merchant system to provide input (e.g., one or more selections) for the generation of a review response, as shown in FIG. 1E.

In operation 230, the processing logic determines a sentiment score associated with a first key review element of the set of key review elements. In an embodiment, the processing logic performs an analysis of key review elements and generates a corresponding sentiment value, score or rating (e.g., as shown in FIGS. 1B and 1E). According to embodiments of the present application, the processing logic may interact (e.g., via a suitable API) with a third party module (e.g., the Google™ Cloud Natural Language API) configured to generate sentiment values or scores.

In operation 240, the processing logic generates a review response including a set of value corresponding to a set of response components, where a first value of the set of values includes the first key review element. In an embodiment, the set of response components can include one or more sections or portions of the response, including, for example, a greeting, a value statement, sentiment keywords, and a closing (as shown in the example in FIG. 1C). The first value can be a value corresponding to one of the response components, such as the examples shown in FIG. 1C. In an embodiment, the values for the response components can be selected from a set of options by a merchant system, as shown in the example interface 115 of FIG. 1D.

FIGS. 2B-2E and 3A-3D illustrate example interfaces relating to the generation of a review response, according to embodiments of the present disclosure. FIG. 2B illustrates an interface configured to enable a merchant system to initiate a process to generate a custom review response including multiple review components. FIG. 2C illustrates an interface to present multiple different options (selectable and editable by the merchant system) for each of the multiple response components. FIG. 2D illustrates an interface to enable a merchant system to generate a custom option for one or more of the response components. In the example shown, values for the "greeting" review component can be customized by the merchant system. The value option can be customized to include an option name and corresponding description for value. Once generated, the custom option can be presented via the interface as an option for the corresponding review component, as shown in FIG. 2C.

FIG. 2E illustrates an interface configured to enable a merchant system to add one or more key review elements (e.g., modifiers and/or keywords) and a corresponding sentiment type (e.g., positive or negative), and a sentiment value (e.g., + or −0 to 100).

In operation 250, the processing logic causes a display of the review response and the review comprising the sentiment score associated with the first key review element. In an embodiment, the processing logic generates an interface accessible by the merchant system which includes the end user review including the key review elements presented in a highlighted manner, as shown in FIG. 1E. As shown in FIG. 1E, the interface can display the sentiment score (e.g., +60) associated with a first key review element (e.g., the "best person" review element). According to embodiments of the present application, the generated review response may be provided to a knowledge network (e.g., the Yext™ Knowledge Network) for further management and processing. For example, in operation 260, the processing logic can distribute or provision the review response to one or more systems or platforms (e.g., a system that received the first review from the end user) for publication or display.

According to embodiments, the review management system may generate and present one or more response templates. In an embodiment, a merchant user navigates to a review response section of an account settings portal of an interface generated by the review management system. In an embodiment, the merchant system can select from the template responses for use in generating review responses on behalf of the merchant system. In an embodiment, the template responses can include an option to "add" a response component to a template response (as shown in FIG. 2D) or an "edit" button to make edits or changes to a template response.

According to embodiments, the review management system enables a merchant user to generate and store a new or customized response template, as shown in FIGS. 2B-2E. In an embodiment, sample text may be included in the text box for each of the response components to assist the merchant user in determining what values to include in the customized response template, as shown in FIG. 2C. Each customized template generated by the review management system on behalf of a merchant system is stored in association with an account of the merchant system. In an embodiment, the customized response templates can be presented to multiple different merchant users (e.g., at different store locations) to enable the different merchant users to generate review responses, using the customized response template, for their individual location.

In an embodiment, the review management system can generate custom sentiment keywords and a corresponding sentiment value for use by a merchant system. As shown in FIG. 2E, in response to a merchant system selecting an "Add option" for "Sentiment Keywords", a graphical user interface is presented to enable generation of a custom sentiment keyword. As shown, a custom sentiment name or label, a sentiment type (e.g., positive or negative), one or more sentiment keywords and/or modifiers, and a sentiment value can be selected. In an embodiment, example values for the sentiment keyword component can be generated in view of the sentiment type. For example, if a positive sentiment type is identified, a sample value for the sentiment keyword component can be "We are happy you appreciated the [MODIFIER][KEYWORD]." In another example, for a negative sentiment type, a template or sample sentiment keyword component value can be "We apologize for the [MODIFIER][KEYWORD]." The custom sentiment keyword option can be stored in association with the merchant system such that the custom sentiment keyword option is accessible via the merchant system account.

Figure 3D:
Figure 3E:

According to embodiments, the review management system can enable a merchant system to build and generate a review response. For example, a merchant system can access an interface displaying a review that supports review response. In an embodiment, the review is "new" and does not have a response associated with it. The merchant user is presented with one or more dropdown menus generated by the review management system to add response components (e.g., a greeting, a value statement, one or more sentiment keywords, and a closing) to build the review response, as shown in FIGS. 3A-3F. In an embodiment, the merchant system can replace any part using the dropdown or re-roll or randomize the response entirely, as shown in FIG. 3E. In an embodiment, the merchant system can add customized or selected text between chosen text blocks or edit a text block added from a dropdown menu. For example, the merchant system may replace a previously selected text block by choosing a new option from a dropdown menu.

Figure 3F:
Figure 3G:
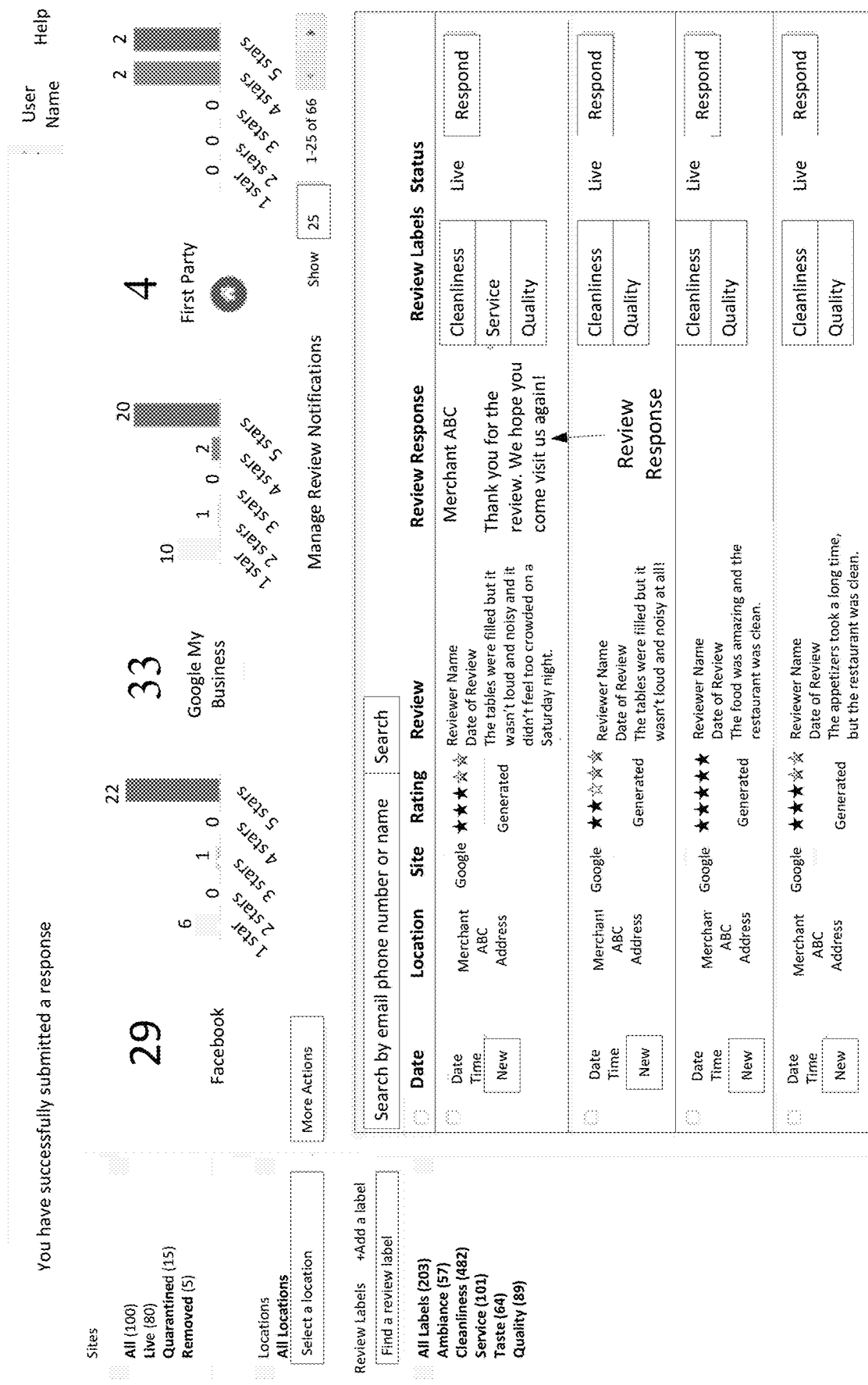

The merchant system may submit the customized response (as shown in FIG. 3F) for provisioning via an interface accessible by the end user that submitted the review. In an embodiment, the review management system may generate a dashboard or account page including an indication of the submission of the review response by the merchant user, as shown in FIG. 3G. In some embodiments, the customized response is sent via email or other communication methods (e.g., SMS, phone, instant method) based on contact information stored in the review management system. In other embodiments, based on the integrations between the review management system and the review sites, the response may be sent to the applicable review site where the end user/reviewer left their review via the review management system. For example, if the reviewer left their review on Yelp™, then based on the aforementioned integrations, the reviewer may leave its response on Yelp™ via the review management system.

In other embodiments, the review and response may be left on a website or application associated with the merchant system. In an embodiment, the review management system can generate analytics associated with a review response, such as: Has the end user opened the email? Has the end user provided a response on the review site? If so, how did the end user respond to the review response?

In some embodiments the review management system can pull back in the analytics and use it to automatically improve its analysis. For example, if an end user (e.g., reviewer) responded negatively to a review response (for example, the tone of the response), the review management system can adjust a template response (e.g., adjust the tone) for use in further generations of review responses.

In other embodiments, the analysis can be adjusted for each individual end user (or group of end users) based on how they respond to the review response. The analytics can be used to improve the relationship between the merchant and its customers. In some embodiments this may be based on multiple reviews. For example, if a reviewer, in its initial review, mentioned that the chicken was well done, but did not mentioned that in a follow-up review, the review management platform may use the data from the initial review and propose a response asking "how the chicken was this time?" This way, if multiple merchant users are separately responding to a reviewer, they do not need to have knowledge of all past reviews. In another embodiment, if a reviewer includes feedback indicating that the chicken would be better if it was marinated, the review management system can propose language asking "was the marinated chicken better than last time?"

Figure 4:
FIG. 4 illustrates an example interface displaying information relating to generation of a review response, according to embodiments of the present disclosure.

In an embodiment, a merchant system may submit a review response that fails to be processed, accepted or stored by the review management system. For example, the review response may fail due to an internal or publisher error. Provided below is an example illustrating a process flow executed by the review management system in the event of a failed review response, as shown in FIG. 4.

In an embodiment, a merchant system may utilize embedded fields associated with an end user review. In an embodiment, a merchant system views a review using the review management system. For example, the merchant system may access the review via a "review detail view" portion of the interface presented by the review management system. The merchant system may clicks a "plus" icon (or other suitable icon or indicator) in the review response text box. The merchant user may select one or more of the following example embedded fields associated with a review as presented by the review management system: end user name, author, rating, publisher, keyword, modifier, location name, location phone number, location website, location website display URL, location website URL, location e-mail address, location address, any custom fields associated with the merchant system and/or the particular location of the merchant.

Figure 5A:
Figure 6:
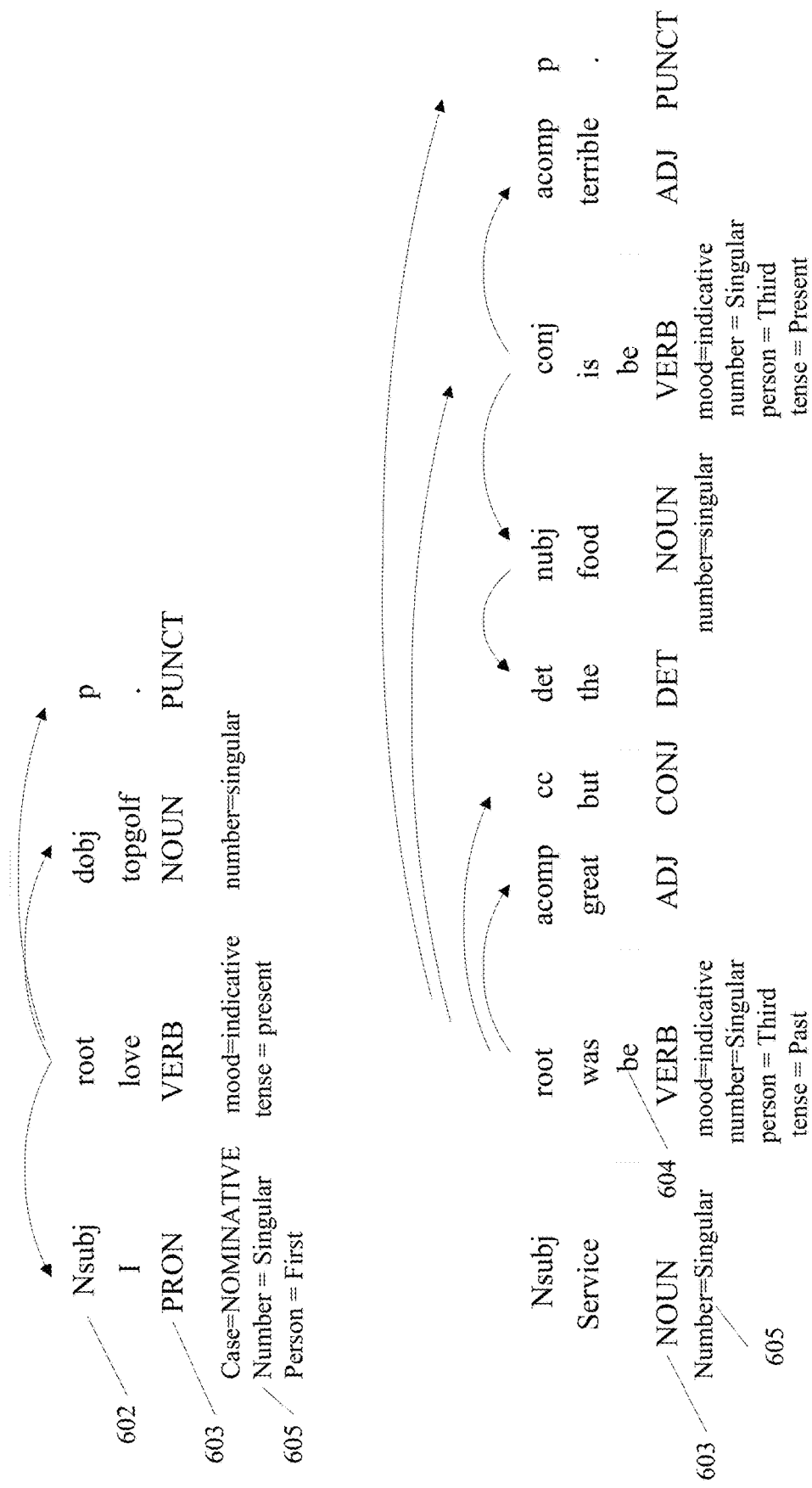
FIG. 6 illustrates an example text string processed by a review management system to identify and label one or more entities associated with the text string, according to embodiments of the present disclosure.

According to embodiments of the present disclosure, additional features and functionality implemented by the review management system are illustrated in FIGS. 5A-5G. For example, FIG. 5A illustrates an example interface presented by the review management system to a merchant system including an identification of negative sentiment keywords from a review. As shown in FIG. 5A, the review management system generates one or more words, phrases or terms extracted from the review that can be added or included in a review response. FIG. 5B illustrates an example interface presented by the review management to a merchant system including a review response generated based on the identification of positive sentiment keywords in a review.

Conventionally, a word cloud (e.g., a data structure presenting the most frequently appearing words or phrases in one or more reviews) based on a review and provide the data structure to a merchant system to provide feedback about what the content of the end user reviews means to the merchant system. However, word clouds are unable to provide the merchant user with depth and actionable insights about the review content. In this regard, word clouds do not display sentiment and context surrounding the review words.

According to embodiments of the present disclosure, the review management system may include processing logic to perform analysis of the content of an end user review to identify elements associated with a sentiment (also referred to as a "sentiment element"). In some embodiments, the review management system executes an enhanced review content analysis to generate deeper insights about the end user reviews.

In an embodiment, the review management system implements an application programming interface (API) to extract elements from a natural language processor (e.g., Google Cloud Natural Language API) of a review. For example, a review may be identified that includes the following text string: "I love topgolf. Service was great but the food is terrible." In an embodiment, the text string may be processed by the review management system to identify and label one or more entities associated with the text string. Example entities may include a person, an organization, a location, an event, a product, a service, and media. In some embodiments, one or more attributes about each word, phrase, symbol, icon, etc. of the text string is determined, as shown in the example illustrated in FIG. 6. In another embodiment, the review management system includes a natural language processor. In an embodiment, the processing and mapping can include identifying a dependency 601 between parse labels 602, parts of speech 603, lemma 604, and morphology 605 associated with a review.

Figure 7:
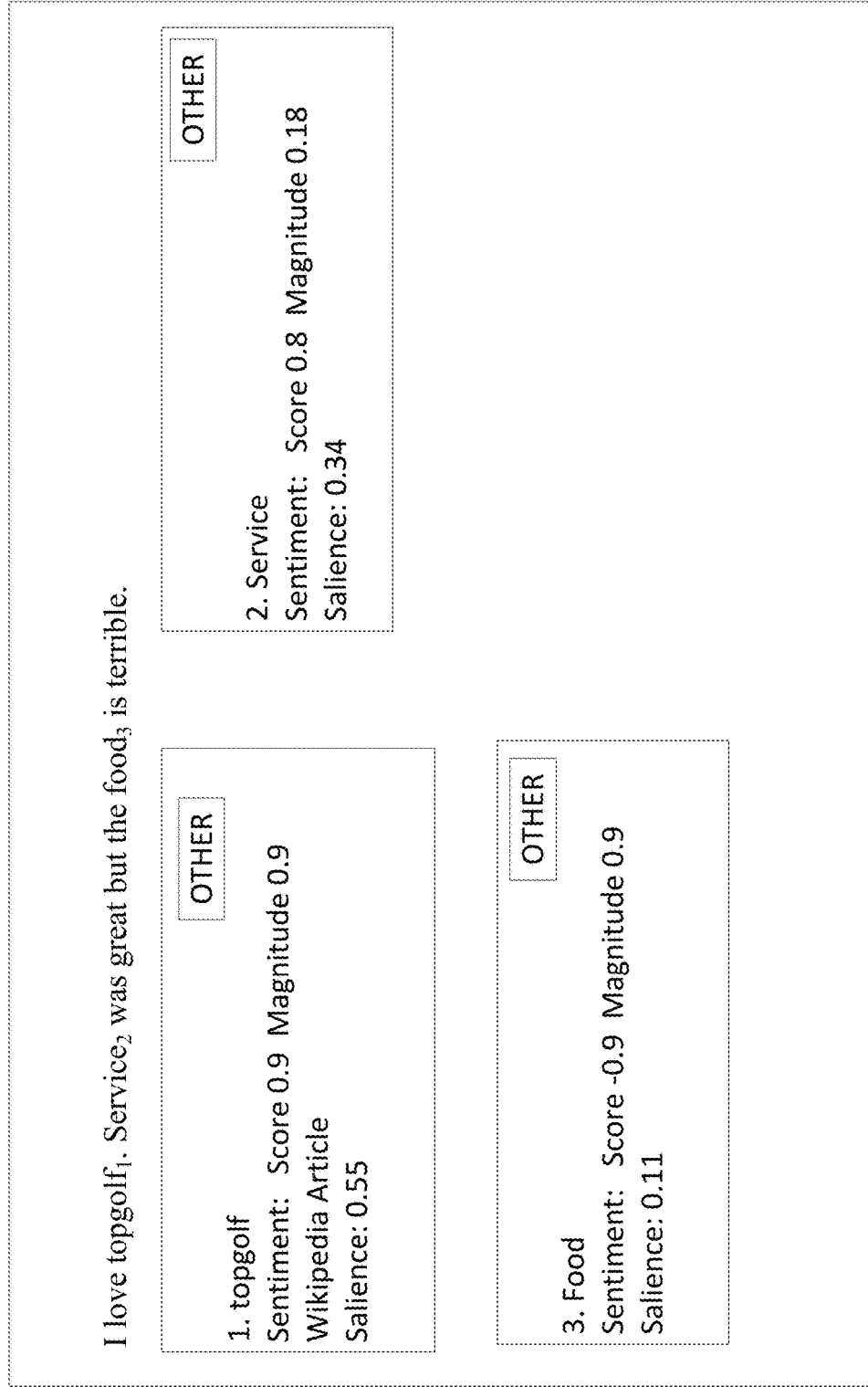
FIG. 7 illustrates an example attribute mapping including an association between attributes and identified entities, generated by a review management system, according to embodiments of the present disclosure.

In some embodiments, using the identified attribute mapping, the review management system generates an association between the attributes and the identified entities, as shown in the example illustrated in FIG. 7. In the example shown in FIG. 7, "topgolf", "Service", and "food" are recognized as entities in the text string. In some embodiments, the identified entities are stored as "Topics" in the review management system. In some embodiments, the text string is processed by the review management system to identify a sentiment associated with each instance or mention of an entity within a block of text. In an embodiment, one or more key adjectives that provide context for the sentiment of the identified entities is determined and stored as "Adjectives". FIG. 8 illustrates an example data structure (e.g., a table) including each entity and an associated sentiment (e.g., a sentiment score) corresponding to each respective mention or instance.

In some embodiments, with the topic and adjective data stored in the review management system, enhanced review content analysis and corresponding results may be presented to a merchant user (e.g., via a report builder module and/or a 'topics' sub-tab of a "Reviews" tab of an interface associated with the review management system). According to embodiments, the review management system may determine or identify one or more of the following objects: topics (e.g., entities identified the most frequently in reviews associated with a merchant user, adjectives (e.g., words that most frequently give topics context to help determine sentiment); and topic groups (e.g., a merchant user-defined entity that encompasses multiple selected topics. According to embodiments, the review management system may determine or identify one or more of the following metrics: mentions (e.g., a frequency with which a topic appears in reviews associated with a merchant user); sentiment or context (e.g., given the context of the block of text surrounding it, the positivity or negativity of the topic; and a rating (e.g., an average of rating of all reviews that contain a given topic).

According to embodiments of the present disclosure, enhanced content analysis of end user review allows merchant users to achieve the following functionality associated with one or more objects: identify and view which topics are showing up in positive or negative reviews, identify and view which adjectives are related to those topics, identify which adjectives are causing topics to have positive or negative sentiment in the reviews, and create a custom collection of many related topics to track and monitor.

According to embodiments of the present disclosure, enhanced content analysis of end user review allows merchant users to achieve the following functionality associated with one or more metrics: identify and view the sentiment of an adjective, topic, or collection, identify and view the rating of a topic or collection, identify and view the number of mentions of a topic or adjective, and identify and view metric performance over time.

According to embodiments of the present disclosure, enhanced content analysis of end user review allows merchant users to view review snippets for a given adjective, navigate to a full set of reviews for an adjective or topic, and view how locations are performing with respect to a topic.

In some embodiments, the review management system manages permissions associated with the review analysis for a merchant system. For example, permissions may be established and stored on behalf of a merchant user. According to embodiments of the present disclosure, the review management system collects data associated with end user reviews associated with a merchant user. In some embodiments, as reviews are submitted to or identified by the review management system, a message may be sent to an entity analysis module and entity sentiment analysis module to process each review and store the corresponding results, as described above.

According to embodiments, the review management system provides functionality to enable a merchant user to select, build, and/or generate one or more reports associated with the corresponding end user reviews. In an embodiment, the review management system includes a report generator configured to generate a report. For example, the report generator may allow a user to generate a report based on one or more keywords dimensions and/or keyword metrics, such as those shown in the following example tables:

| | |
|---|---|
| Name | Keywords |
| Parent | Reviews |
| Detail | Entities identified the most frequently in your reviews |
| Applicable Metrics | Reviews > Average Rating/New Reviews Keywords > Sentiment/Mentions |
| Name | Sentiment |
| Parent | Keywords |
| Detail | Sentiment score of review Keywords |
| Applicable Dimensions | Time > Days/Weeks/Months/Months Retail Locations > Locations Reviews > Average Rating/ New Reviews/Keywords |
| Applicable Filters | Locations > Locations Reviews > Frequent Words/Ratings/Sites |
| Name | Mentions |
| Parent | Keywords |
| Detail | Number of time a review Keyword is mentioned |
| Applicable Dimensions | Time > Days/Weeks/Months/Months Retail Locations > Locations Reviews > Average Rating/New Reviews/Keywords |
| Applicable Filters | Locations > Locations Reviews > Frequent Words/Ratings/Sites |

Figure 9:
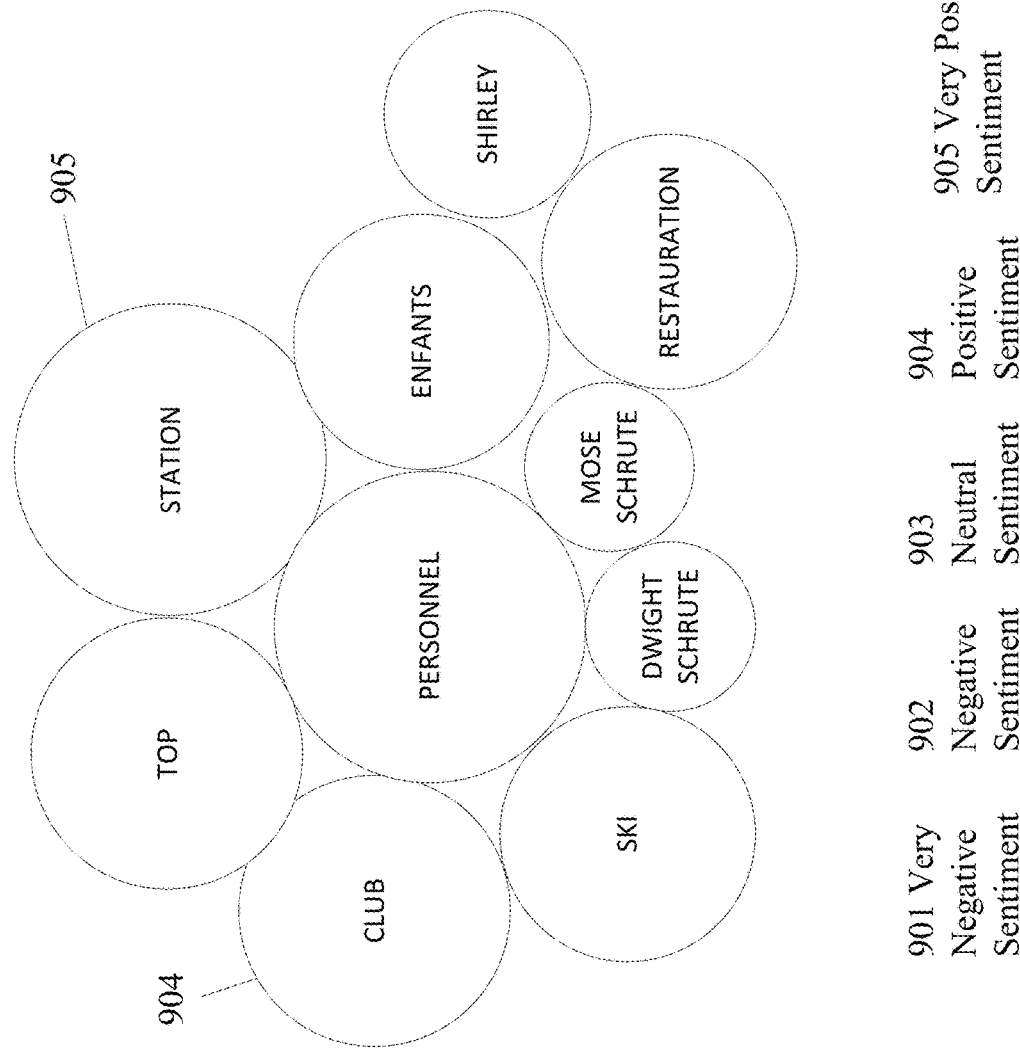
FIG. 9 illustrates a graph including example keywords and corresponding sentiment scoring, according to embodiments of the present disclosure.
Figure 10:
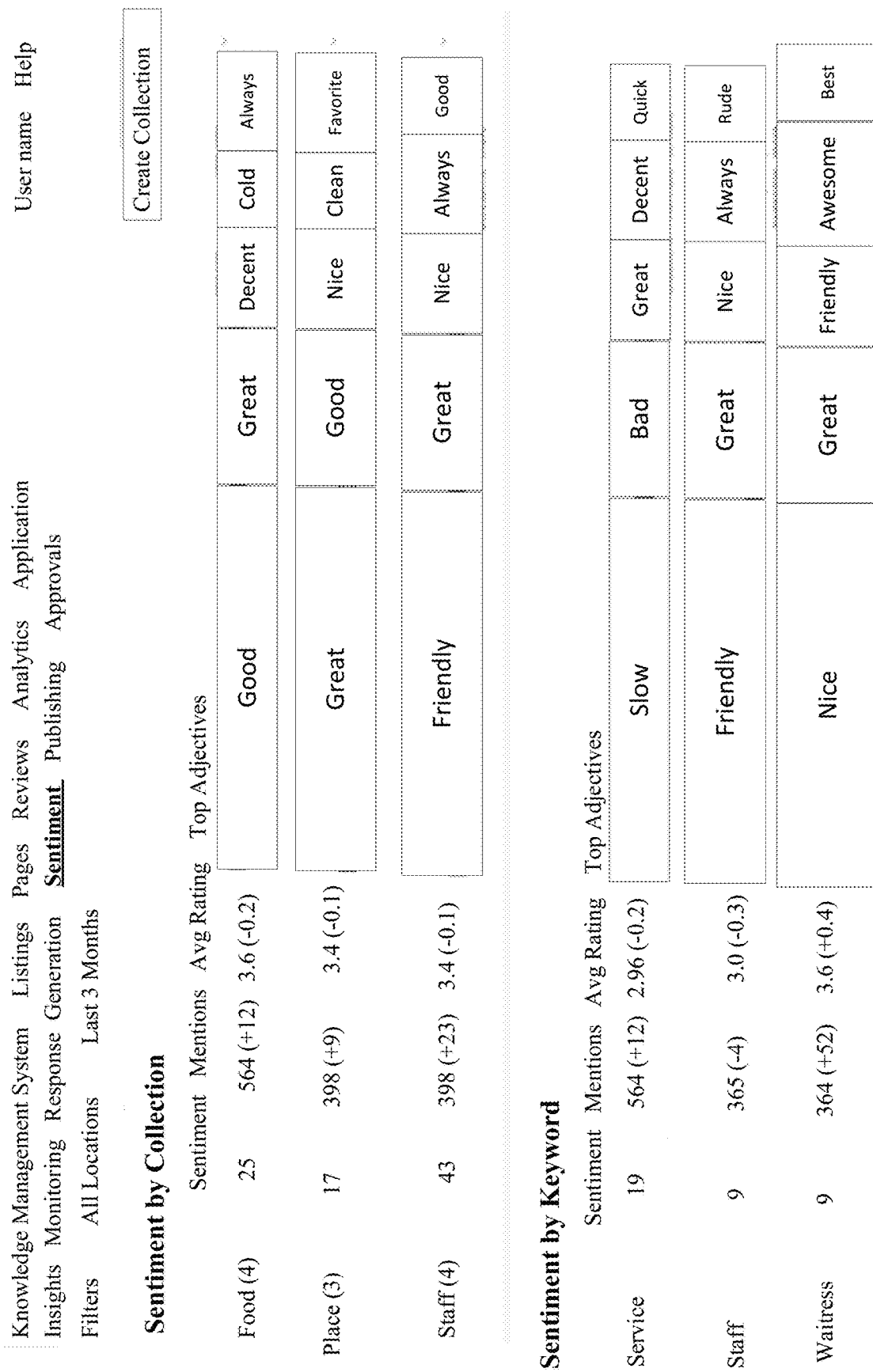

According to some embodiments, the review management system may enable a user (e.g., a merchant user) to update a word cloud (e.g., an Insights Word Cloud) associated with one or more reviews. For example, a merchant user navigates to a "Content Analysis" portion of an "insights" webpage. The merchant user can view a "Word Frequency"

diagram, such as the diagram shown in FIG. 9. In an embodiment, words are selected from Keywords in Sentiment analysis based on number of mentions. In an embodiment, a color gradient (as represented by the legend indicating: 901 Very Negative Sentiment, 902 Negative Sentiment, 903 Neutral Sentiment, 904 Positive Sentiment, and 905 Very Positive Sentiment in FIG. 9) based on average sentiment score of the keyword may be applied. In an embodiment, key and hover functionality may be provided. In an embodiment, the user may download a file including the word diagram (e.g., a CSV file). In an embodiment, the downloaded file includes a "Sentiment" column, wherein the sentiment value represents an average of the sentiment score corresponding to a given keyword, as shown in FIG. 10. In an example, the sentiment value may be zero or a negative value. According to embodiments, the review management system may provide functionality to enable a user to update generation page keywords. In some embodiments, a user may navigate to a "Generation" tab of a "Reviews" portion of an interface generated by the review management system. In an embodiment, the user may view a new keyword graph with data used from a "Topics" page to use topics-related-data.

According to embodiments, the review management system may provide functionality to enable a user to view a sentiment page associated with one or more reviews. In an embodiment, the user may navigate to a "Sentiment" tab of a "Reviews" portion of an interface generated by the review management systems. In an embodiment, the user may view a ranked list of keywords for their reviews, as shown in the example interface of FIG. 10.

As shown in FIG. 10, the interface can display a "Sentiment by Collection" section and a "Sentiment by Keyword" section. In the Sentiment by Keyword section, for each keyword (e.g., "Service", "Staff", "Waitress", "People"), the interface can display a corresponding sentiment score, number of mentions, average rating, and top adjectives or modifiers associated with the keyword. In an embodiment, the sentiment score of the keyword can range from −100 to 100. In the interface, a circle outline is displayed which ranges from 0° to 360° with a clockwise indicator representing positive sentiment and a counterclockwise indicator representing a negative sentiment. In an embodiment, a change in sentiment value can be generated to represent a change in the sentiment score between a current filter period and a previous period of the same length.

In an embodiment, the interface can display a number of times the keyword appears in reviews. In an embodiment, keywords that appear in reviews multiple times can count as two plus mentions. In an embodiment, the review management system generates a mentions delta value representing a change in a number of mentions between a current filter period and a previous period of the same length. In an embodiment, the review management system generates a star rating value representing an average star rating of all reviews that mention the keyword and a star rating delta value representing a change in star rating between a current filter period and a previous period of the same length. The review management system can further identify a set of adjectives representing a set of the most common adjectives associated with the keyword. In an embodiment, the review management system can generate an adjective mentions value represented by a horizontal bar having a width calculated by dividing a number of mentions of the adjective by a sum of the number of mentions of a set of adjectives (e.g., the top ten adjectives) multiplied by 100.

As shown in FIG. 10, the review management system can generate a "Sentiment by Collection" section including a list of collections of keyword groups (e.g., "Food", "Place", and "Staff") with a keyword count value (e.g., a number of keywords in the collection). In an embodiment, the review management system can generate additional values associated with the Sentiment by Collection section, as described above, based on aggregated statistics for set of the keywords in each collection.

In an embodiment, the user may click a "View More Keywords" link to reveal additional keywords (e.g., ten or more keywords at a time). According to embodiments, the review management system may provide functionality to enable a user to sort multiple sentiments or sentiment pages. In some embodiment, the user may navigate to a "Sentiment" tab of a "Reviews" portion of an interface generated by the review management system. In some embodiments, the user may sort the sentiments by "Keyword" section using one or more of the following example criteria: keyword name (alphabetically A to Z or Z to A), a number of mentions, the change in mentions value, a sentiment score, a change in sentiment score value, or an average rating.

In some embodiments, keywords within collections may be subject to the above criteria as set by the keywords section (e.g., if an alphabetical sort is selected, then expanding a collection may generate a set of keywords that are also sorted alphabetically. In an embodiment, default page sorting criteria may be set (e.g., sorting by a Number of Mentions from most to least).

According to embodiments, the review management system may provide functionality to enable a user to filter sentiments and/or sentiment pages. In some embodiments, a user may navigate to a "Sentiment" tab of a "Reviews" portion of an interface generated by the review management system. In an embodiment, the user may be presented with page default filters, such as a location filter or a date filter. In some embodiments, the user may apply one or more filters and the applied page filters enable the presentation of data for reviews that match the filter criteria. In some embodiments, one or more metrics update to include data for reviews that match the filter criteria.

Figure 11:
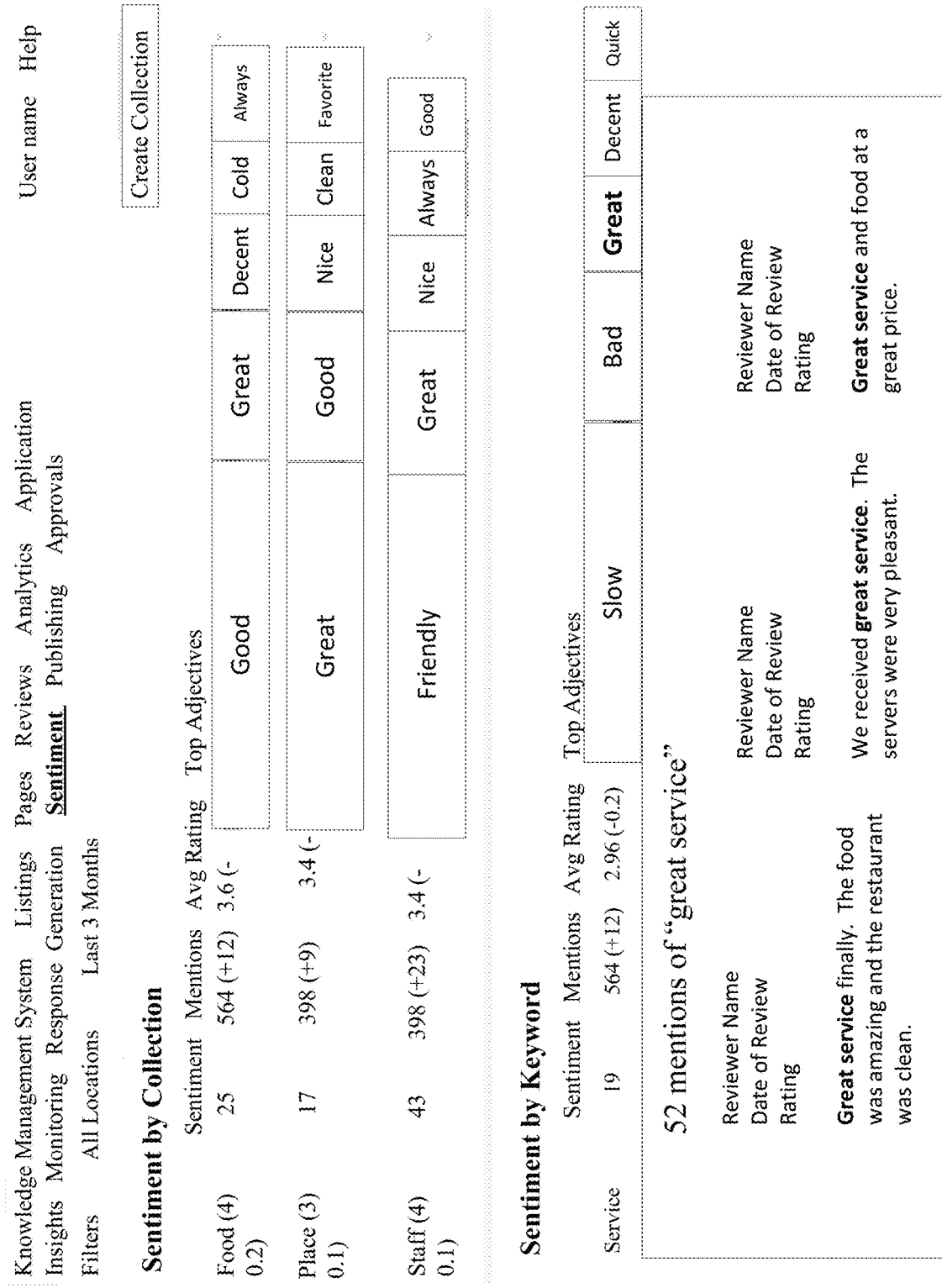

According to embodiments, the review management system may provide functionality to enable a user to execute a further review or drilldown on one or more keywords. In some embodiments, a user may click on or otherwise interact with a row containing a keyword, as shown in the example illustrated in FIG. 11. In an embodiment, clicking on an area other than on a specific adjective may expand the row with the first (highest mentions) adjective selected. In an embodiment, clicking on a specific adjective may expand the row with the clicked adjective selected. In an embodiment, a keyword row may be expanded to present more information. As shown in FIG. 11, the user may view data associated with the selected adjective, such as, for example, a header section including a number of mentions associated with a modifier, keyword, or modifier-keyword pair, and a delta value representing a change in the number of mentions over a period of time. The user can also view one or more review objects such as a publisher icon, reviewer name, star rating, and content of the review (e.g., with modifier and/or keyword presented in bold or highlighted text).

According to embodiments, the review management system may provide functionality to enable a user to add and edit a collection. As shown in FIG. 12, a user may view a popup window with configuration options. In an embodiment, the user may name a collection and select one or more keywords to include in a group. In an embodiment, selecting a "+Add Keyword" option, as shown in FIG. 12, may open a search dropdown that includes a list of keywords. In an embodiment, the user may save or store the added collection and the added collection may be presented in a list in the "Collections" section of the review management system. In an embodiment, the created collection may be associated with an icon indicating it is a collection.

Figure 13:
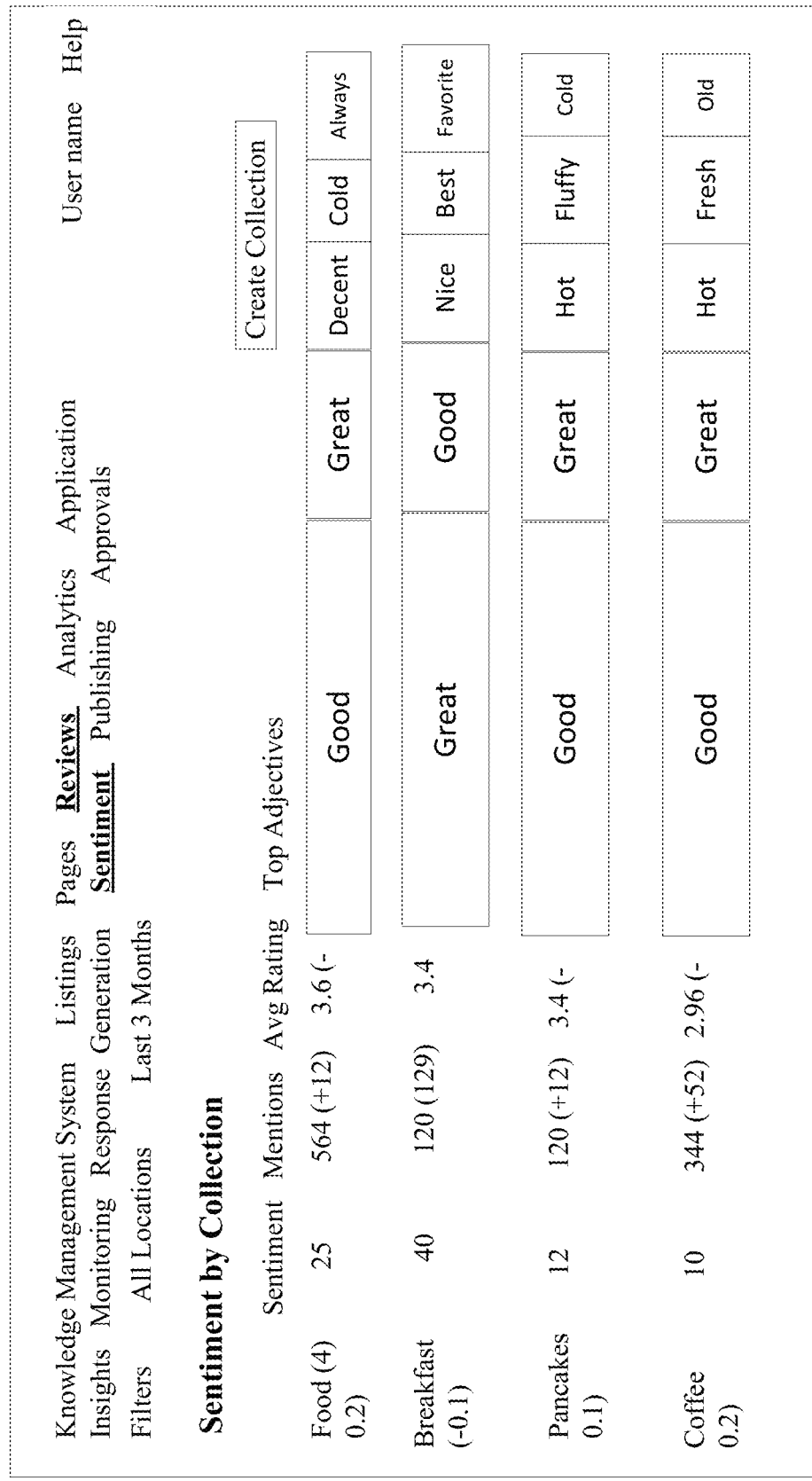

According to embodiments, a user may edit a collection by clicking on link associated with an existing collection. In an embodiment, the user may be presented with one or more configuration options associated with the collection. For example, the user may rename a collection, add keywords, and/or remove keywords. According to embodiments, a user may remove a collection. In an embodiment, a user may view a popup window with configuration options including an option to delete a collection. For example, removal of a collection may result in the removal of all keywords from the group. According to embodiments, the review management system may provide functionality to enable a user to view additional information (e.g., drilldown) associated with a collection. As shown in FIG. 13, a user may click on a row containing a collection to expand the collection and present additional information associated with the selected collection. In an embodiment, the user may view a row for each keyword assigned to the given collection. For example, each row may have the same data as a regular keyword in the table that is not associated with a collection. In an embodiment, the user may expand one or more of the keywords to review additional information about the selected keyword.

Figure 14A:
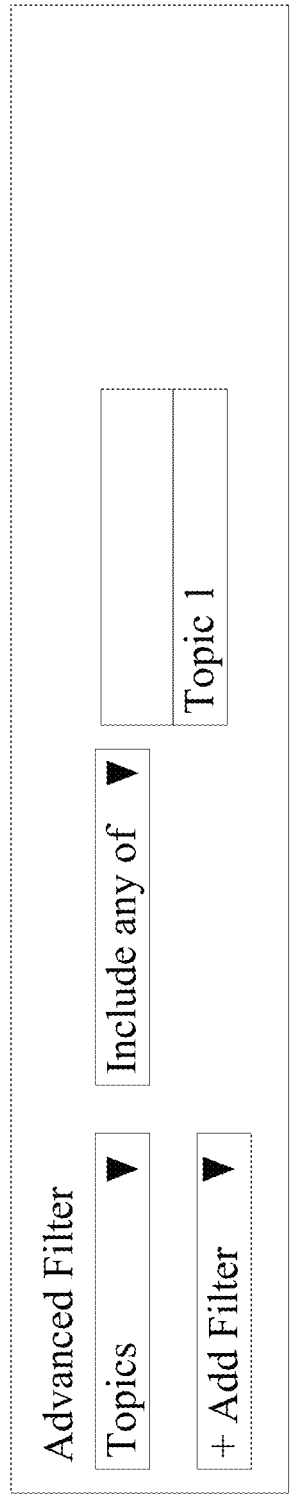
FIGS. 14A and 14B illustrate example interfaces displaying filters relating to review information, according to embodiments of the present disclosure.
Figure 14B:
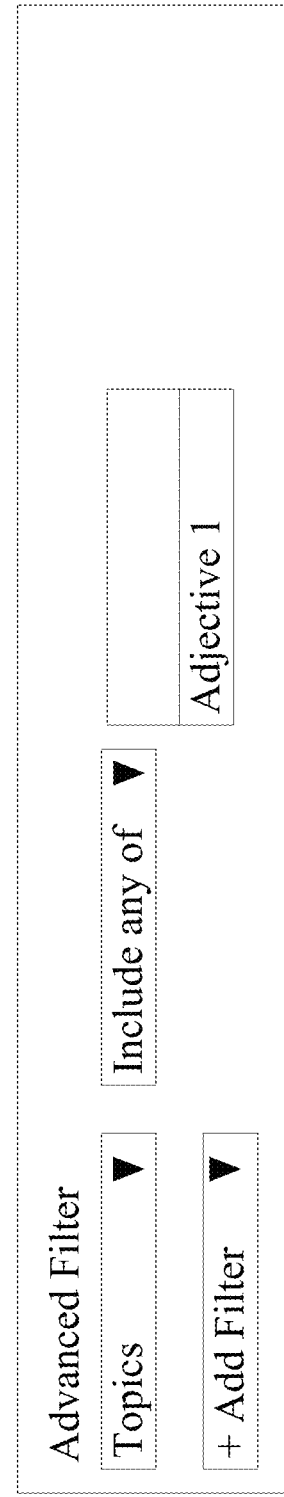

According to embodiments, the review management system may provide functionality to enable a user to apply monitoring and/or response tab filters. As shown in FIG. 14A, a user may apply a filter based on one or more keywords. As shown in FIG. 14B, a user may apply a filter based on one or more adjectives.

Figure 15:
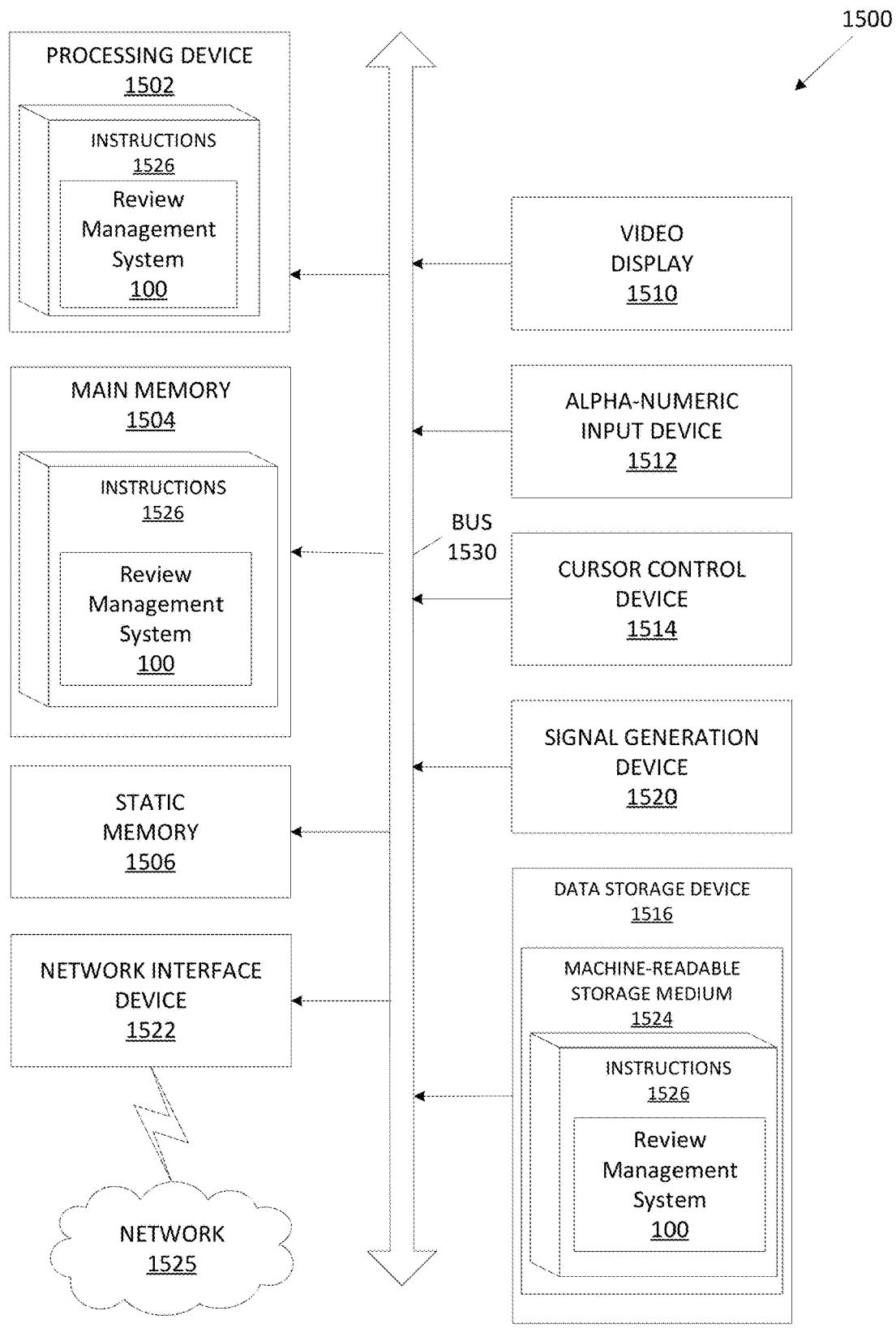
FIG. 15 is a block diagram of an example computer system in which implementations of the present disclosure can operate.

FIG. 15 illustrates an example computer system 1500 operating in accordance with some embodiments of the disclosure. In FIG. 15, a diagrammatic representation of a machine is shown in the exemplary form of the computer system 1500 within which a set of instructions, for causing the machine to perform any one or more of the methodologies discussed herein, may be executed. In alternative embodiments, the machine 1500 may be connected (e.g., networked) to other machines in a local area network (LAN), an intranet, an extranet, or the Internet. The machine 1500 may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine 1500. Further, while only a single machine is illustrated, the term "machine" shall also be taken to include any collection of machines that individually or jointly execute a set (or multiple sets) of instructions to perform any one or more of the methodologies discussed herein.

The example computer system 1500 may comprise a processing device 1502 (also referred to as a processor or CPU), a main memory 1504 (e.g., read-only memory (ROM), flash memory, dynamic random access memory (DRAM) such as synchronous DRAM (SDRAM), etc.), a static memory 1506 (e.g., flash memory, static random access memory (SRAM), etc.), and a secondary memory (e.g., a data storage device 1516), which may communicate with each other via a bus 1530.

Processing device 1502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1502 may also be one or more special-purpose processing devices such as an application specific integrated circuit (ASIC), a field programmable gate array (FPGA), a digital signal processor (DSP), network processor, or the like. Processing device 1502 is configured to execute a knowledge search system 100 for performing the operations and steps discussed herein. For example, the processing device 1502 may be configured to execute instructions implementing the processes and methods described herein, for supporting a knowledge search system 100, in accordance with one or more aspects of the disclosure.

Example computer system 1500 may further comprise a network interface device 1522 that may be communicatively coupled to a network 1525. Example computer system 1500 may further comprise a video display 1510 (e.g., a liquid crystal display (LCD), a touch screen, or a cathode ray tube (CRT)), an alphanumeric input device 1512 (e.g., a keyboard), a cursor control device 1514 (e.g., a mouse), and an acoustic signal generation device 1520 (e.g., a speaker).

Data storage device 1516 may include a computer-readable storage medium (or more specifically a non-transitory computer-readable storage medium) 1524 on which is stored one or more sets of executable instructions 1526. In accordance with one or more aspects of the disclosure, executable instructions 1526 may comprise executable instructions encoding various functions of the knowledge search system 100 in accordance with one or more aspects of the disclosure.

Executable instructions 1526 may also reside, completely or at least partially, within main memory 1504 and/or within processing device 1502 during execution thereof by example computer system 1500, main memory 1504 and processing device 1502 also constituting computer-readable storage media. Executable instructions 1526 may further be transmitted or received over a network via network interface device 1522.

While computer-readable storage medium 1524 is shown as a single medium, the term "computer-readable storage medium" should be taken to include a single medium or multiple media. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "extracting", "determining," "generating," "causing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the disclosure also relate to an apparatus for performing the methods described herein. This apparatus may be specially constructed for the required purposes, or it may be a general-purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear as set forth in the description below. In addition, the scope of the disclosure is not limited to any particular programming language. It will be appreciated that a variety of programming languages may be used to implement the teachings of the disclosure.

It is to be understood that the above description is intended to be illustrative, and not restrictive. Many other embodiment examples will be apparent to those of skill in the art upon reading and understanding the above description. Although the disclosure describes specific examples, it will be recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
retrieving, by a processing device, via an application programming interface associated with a third-party website, a review associated with a merchant system, wherein the review comprises a plurality of review elements, and wherein the review is posted by an end-user system to the third-party web site;
receiving, from the merchant system, a selection of a set of key review elements from the plurality of review elements;
generating, based on the selection, a review response template for the merchant system;
extracting, from a plurality of reviews posted via a plurality of third-party review platforms, the set of key review elements from the plurality of review elements;
determining a sentiment score associated with a key review element of the set of key review elements extracted from a first review posted by a first end-user system to a first third-party review platform of the plurality of third-party review platforms;
generating, in view of the review response template, a review response comprising a set of values corresponding to a set of response components, wherein a value of the set of values comprises the key review element;
distributing, via a first application program interface, the review response to the first third-party review platform;
generating a graphical user interface comprising a display of a ranked listing of the set of key review elements corresponding to a set of reviews associated with the merchant system, wherein a corresponding sentiment score is displayed with each key review element of the set of key review elements;
receiving, via the first third-party review platform, feedback from an end user system relating to the review response;
adjusting one or more terms of the review response template associated with the review response in view of the feedback to generate an updated review response template;
generating, in view of the updated review response template, an updated review response comprising an updated set of values corresponding to the set of response components; and
distributing, via a second application program interface, the updated review response to a second third-party review platform.

2. The method of claim 1, further comprising receiving, from the merchant system, a selection of a first value of a first response component of the review response.

3. The method of claim 1, further comprising:
generating a plurality of options for each of the set of response components; and
receiving selections from the plurality of options from the merchant system.

4. The method of claim 1, further comprising:
generating a custom response component based on information received from the merchant system; and
storing the custom response component in the review response template associated with the merchant system.

5. The method of claim 1, further comprising generating a further display comprising a set of values corresponding to a set of keywords identified in a plurality of reviews associated with the merchant system, wherein the set of values comprises at least one of one or more an aggregate sentiment score, a number of mentions of each of the keywords of the set of keywords, or a set of modifiers associated with each of the keywords of the set of keywords.

6. A system comprising:
a memory to store instructions; and
a processing device operatively coupled to the memory, the processing device to execute the instructions to:

retrieve, via an application programming interface associated with a third-party website, a review associated with a merchant system, wherein the review comprises a plurality of review elements, and wherein the review is posted by an end-user system to the third-party website;

receive, from the merchant system, a selection of a set of key review elements from the plurality of review elements;

generate, based on the selection, a review response template for the merchant system;

extract, from a plurality of reviews posted via a plurality of third-party review platforms, the set of key review elements from the plurality of review elements;

determine a sentiment score associated with a key review element of the set of key review elements extracted from a first review posted by a first end-user system to a first third-party review platform of the plurality of third-party review platforms;

generate, in view of the review response template, a review response comprising a set of values corresponding to a set of response components, wherein a value of the set of values comprises the key review element;

distribute, via a first application program interface, the review response to the first third-party review platform;

generate a graphical user interface comprising a display of a ranked listing of the set of key review elements corresponding to a set of reviews associated with the merchant system, wherein a corresponding sentiment score is displayed with each key review element of the set of key review elements;

receive, via the first third-party review platform, feedback from an end user system relating to the review response;

adjust one or more terms of the review response template associated with the review response in view of the feedback to generate an updated review response template;

generate, in view of the updated review response template, an updated review response comprising an updated set of values corresponding to the set of response components; and distribute, via a second application program interface, the updated review response to a second third-party review platform.

7. The system of claim 6, the processing device to execute the instructions to receive, from the merchant system, a selection of a first value of a first response component of the review response.

8. The system of claim 6, the processing device to execute the instructions to:

generate a plurality of options for each of the set of response components; and receive selections from the plurality of options from the merchant system.

9. The system of claim 6, the processing device to execute the instructions to:

generate a custom response component based on information received from the merchant system; and store the custom response component in the review response template associated with the merchant system.

10. A non-transitory computer readable storage medium having instructions that, if executed by a processing device, cause the processing device to:

retrieve, via an application programming interface associated with a third-party website, a review associated with a merchant system, wherein the review comprises a plurality of review elements, and wherein the review is posted by an end-user system to the third-party website;

receive, from the merchant system, a selection of a set of key review elements from the plurality of review elements;

generate, based on the selection, a review response template for the merchant system;

extract, from a plurality of reviews posted via a plurality of third-party review platforms, the set of key review elements from the plurality of review elements;

determine a sentiment score associated with a key review element of the set of key review elements extracted from a first review posted by a first end-user system to a first third-party review platform of the plurality of third-party review platforms;

generate, in view of the review response template, a review response comprising a set of values corresponding to a set of response components, wherein a value of the set of values comprises the key review element;

distribute, via a first application program interface, the review response to the first third-party review platform;

generate a graphical user interface comprising a display of a ranked listing of the set of key review elements corresponding to a set of reviews associated with the merchant system, wherein a corresponding sentiment score is displayed with each key review element of the set of key review elements;

receive, via the first third-party review platform, feedback from an end user system relating to the review response;

adjust one or more terms of the review response template associated with the review response in view of the feedback to generate an updated review response template;

generate, in view of the updated review response template, an updated review response comprising an updated set of values corresponding to the set of response components; and distribute, via a second application program interface, the updated review response to a second third-party review platform.

11. The non-transitory computer readable storage medium of claim 10, the processing device to receive, from the merchant system, a selection of a first value of a first response component of the review response.

12. The non-transitory computer readable storage medium of claim 10, the processing device to:

generate a plurality of options for each of the set of response components; and receive selections from the plurality of options from the merchant system.

13. The non-transitory computer readable storage medium of claim 10, the processing device to receive the review from the first third-party review platform.

14. The non-transitory computer readable storage medium of claim 10, the processing device to:

generate a custom response component based on information received from the merchant system; and store the custom response component in the review response template associated with the merchant system.

15. The non-transitory computer readable storage medium of claim 10, the processing device to generate a further display comprising a set of values corresponding to a set of keywords identified in a plurality of reviews associated with the merchant system, wherein the set of values comprises at least one of one or more an aggregate sentiment score, a number of mentions of each of the keywords of the set of keywords, or a set of modifiers associated with each of the keywords of the set of keywords.

* * * * *